United States Patent
Fujimura (10) Patent No.: US 9,989,245 B2
(45) Date of Patent: Jun. 5, 2018

(54) SUPERHEATED STEAM TREATMENT APPARATUS

(71) Applicant: Shin-Etsu Chemical Co., Ltd., Chiyoda-ku, Tokyo (JP)

(72) Inventor: Naoto Fujimura, Yokohama (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 234 days.

(21) Appl. No.: 15/031,940

(22) PCT Filed: Oct. 10, 2014

(86) PCT No.: PCT/JP2014/077166
§ 371 (c)(1),
(2) Date: Apr. 25, 2016

(87) PCT Pub. No.: WO2015/060140
PCT Pub. Date: Apr. 30, 2015

(65) Prior Publication Data
US 2016/0273758 A1    Sep. 22, 2016

(30) Foreign Application Priority Data
Oct. 24, 2013 (JP) ................................. 2013-221181

(51) Int. Cl.
| | | |
|---|---|---|
| F22G 1/16 | (2006.01) | |
| H05B 6/10 | (2006.01) | |
| F22B 1/28 | (2006.01) | |

(52) U.S. Cl.
CPC .............. *F22G 1/165* (2013.01); *F22B 1/281* (2013.01); *H05B 6/108* (2013.01); *Y02P 80/154* (2015.11)

(58) Field of Classification Search
CPC .......... F22G 1/165; F22B 1/281; H05B 6/108
See application file for complete search history.

(56) References Cited

U.S. PATENT DOCUMENTS 7,115,845 B2 * 10/2006 Nomura ................ B24B 49/105
219/630
2003/0230567 A1 * 12/2003 Centanni .................. A61L 2/07
219/628
(Continued)

FOREIGN PATENT DOCUMENTS

CN    201785237 U    4/2011
EP    1 351 016 A2    10/2003
(Continued)

OTHER PUBLICATIONS

Extended European Search Report dated May 10, 2017, for European Patent Application No. 14856625.0, 5 pages.
(Continued)

*Primary Examiner* — Nathaniel Herzfeld
(74) *Attorney, Agent, or Firm* — Brinks Gilson & Lione (57) ABSTRACT

To provide a superheated steam treatment apparatus capable of efficiently treating an object by superheated steam containing a high concentration of hydroxyl radicals. The superheated steam treatment apparatus includes an induction heating unit 4 configured to generate superheated steam by induction heating saturated stream, a treatment chamber 5 configured to allow the superheated steam generated by the induction heating unit 4 to be introduced thereinto, and a discharge treatment unit 6 located in the treatment chamber 5 and configured to treat the introduced superheated steam by discharge. The discharge treatment unit 6 has a frame serving as a support for the discharge treatment unit, a discharge electrode located at an upper part of the frame, a mesh-like opposite electrode located below the discharge electrode, and a high-frequency power source configured to supply high-frequency, high-voltage power between the discharge electrode and the opposite electrode to cause the discharge, whereby an object immediately below the oppo- (Continued)

site electrode is allowed to be treated by the superheated steam having an increased hydroxyl radical concentration due to the discharge.

11 Claims, 8 Drawing Sheets

(56) References Cited

U.S. PATENT DOCUMENTS

| | | | |
|---|---|---|---|
| 2008/0141953 A1 | 6/2008 | Hirayama et al. | |
| 2009/0223076 A1* | 9/2009 | Kim | A61L 2/07 34/72 |
| 2011/0089163 A1* | 4/2011 | Fujimura | B24B 49/105 219/628 |
| 2016/0262212 A1* | 9/2016 | Tonomura | H05B 6/06 |
| 2016/0278167 A1* | 9/2016 | Tonomura | H05B 6/04 |

FOREIGN PATENT DOCUMENTS

| | | | |
|---|---|---|---|
| JP | 08-135903 | 5/1996 | |
| JP | 2000-065312 A | 3/2000 | |
| JP | 2000065312 A * | 3/2000 | ........... B24B 49/105 |
| JP | 2002-191338 A | 7/2002 | |
| JP | 2005-224757 | 8/2005 | |
| JP | 3980595 B | 9/2007 | |
| WO | WO 2004/005798 A1 | 1/2004 | |
| WO | WO 2009/148000 A1 | 12/2009 | |

OTHER PUBLICATIONS

English translation of the International Search Report dated Jan. 13, 2015 for International Patent Application No. PCT/JP2014/077166.

\* cited by examiner

SUPERHEATED STEAM TREATMENT APPARATUS

RELATED APPLICATIONS

The present patent document is the national stage of International Application No. PCT/JP2014/077166, filed with the Japanese Patent Office on Oct. 10, 2014, and which claims priority to Japanese Application No. 2013-221181, filed Oct. 24, 2013, both of which are hereby incorporated by reference in their entirety.

TECHNICAL FIELD

The present invention relates to a superheated stream treatment apparatus capable of generating active superheated steam.

BACKGROUND ART

The superheated steam technology is expected to have wide applicability, and therefore, intensive studies have been made concerning dehydration, fresh food processing and so on. In many cases, however, it could not be put into practical use for certain reasons, e.g., too much energy is required to generate high-temperature superheated steam; energy that dissipates as heat increases with temperature; the production cost greatly increases.

Under such circumstances, efforts have been made to improve the efficiency and effectiveness so as to reduce the cost, improve the performance and expand the range of applications. As a result, the practical use of the superheated steam technology is now discussed in wide applications, e.g., non-oil processed foods, evaporation of solvent for casting films, production of bamboo charcoal for hydroponics, dehydration of wood flour and prevention of mold growth therein.

The generation of low-temperature, active superheated steam is realized by an electromagnetic induction type superheated steam device, in which superheated steam can be generated with an induction heating unit placed in a high-frequency magnetic field and by supplying heat from eddy-current losses or hysteresis losses inside the induction heating unit (for example, see Patent Literature 1).

As it is thought that hydroxyl radicals contribute greatly to the reactivity of superheated steam at a relatively low temperature (about 300° C. or less), treating the generated superheated steam by discharge has been proposed so as to efficiently generate hydroxyl radicals in the superheated steam (for example, see Patent Literature 2).

CITATION LIST

Patent Literature

Patent Literature 1: Japanese Unexamined Patent Application Publication No. 2002-191338
Patent Literature 2: WO2009/148000

SUMMARY OF INVENTION

Technical Problem

In an active steam generator disclosed in Patent Literature 2, saturated steam produced by an induction heating unit is fed to one end of a cylindrical discharge treatment unit, and active steam converted into low-temperature plasma by the discharge treatment is led to the vicinity of an object through a discharge pipe connected to the other end of the discharge treatment unit and then used for treatment. In the configuration of the active steam generator disclosed in Patent Literature 2, however, since hydroxyl radicals have an extremely short lifetime in the order of microseconds (about 100 μseconds or less), most of hydroxyl radicals disappear before the active steam is led to the vicinity of the object through the discharge pipe.

The present invention is to solve the above-mentioned problem and has an object to provide a superheated steam treatment apparatus capable of efficiently treating an object by superheated steam containing a high concentration of highly reactive hydroxyl radicals.

Solution to Problem (1) A superheated steam treatment apparatus according to the present invention, which is provided in order to solve the above-mentioned problem, comprises an induction heating unit configured to generate superheated steam by induction heating saturated stream, a treatment chamber configured to allow the superheated steam generated by the induction heating unit to be introduced thereinto, and a discharge treatment unit located in the treatment chamber and configured to treat the introduced superheated steam by discharge. Moreover, the discharge treatment unit has a frame serving as a support for the discharge treatment unit, a discharge electrode located at an upper part of the frame and having a central conductor enclosed with an insulator, a mesh-like opposite electrode located below the discharge electrode, and a high-frequency power source configured to supply high-frequency, high-voltage power between the discharge electrode and the opposite electrode to cause barrier discharge, whereby an object immediately below the opposite electrode is allowed to be treated by the superheated steam having an increased hydroxyl radical concentration due to the barrier discharge.

(2) The superheated steam treatment apparatus according to the present invention may further comprise a conveyor means for moving the object into the treatment chamber, through a region immediately below the opposite electrode in the discharge treatment unit, and out of the treatment chamber.

(3) In the superheated steam treatment apparatus according to the present invention, at a position upstream of the discharge treatment unit inside the treatment chamber, the conveyor means may permit the object to be exposed to the superheated steam introduced into the treatment chamber so as to perform pretreatment.

(4) In the superheated steam treatment apparatus according to the present invention, with the object placed immediately below the opposite electrode of the discharge treatment unit, the high-frequency power source may avoid supplying the power to the discharge treatment unit for a predetermined time after the introduction of the superheated steam into the treatment chamber, thereby allowing the object to be pretreated for the predetermined time by the superheated steam inside the treatment chamber, and after the elapse of the predetermined time, the high-frequency power source may start to supply the power to the discharge treatment unit to cause the barrier discharge.

(5) In the superheated steam treatment apparatus according to the present invention, the discharge treatment unit may have a gas supply port for supplying a gas to a region where the barrier discharge occurs, and upon the introduction of the superheated steam into the treatment chamber, the gas supply port may allow an argon gas, a helium gas or a mixture gas thereof to be supplied at a ratio of 20 to 400 parts by weight to 100 parts by weight of the superheated steam.

(6) The superheated steam treatment apparatus according to the present invention may further comprise an insulator member between the discharge electrode and the opposite electrode; (7) particularly, the insulator member may be a cover enclosing the discharge electrode (8) In the superheated steam treatment apparatus according to the present invention, the induction heating unit may be a cylindrical container partitioned into a plurality of spaces with a plurality of partition walls, and one or more openings may be formed in each of the partition walls such that openings in adjacent partition walls do not face each other.

(9) Particularly, the opening may have a maximum diameter equal to or less than 5 mm.

(10) In the superheated steam treatment apparatus according to the present invention, the spaces partitioned with the partition walls may be filled with spherical or amorphous magnetic particles to have a porosity equal to or less than 30% inside the container.

(11) In the superheated steam treatment apparatus according to the present invention, the saturated steam supplied to the induction heating unit may have a pressure of 1.1 to 1.5 atmospheres.

Advantageous Effects of Invention

According to the superheated steam treatment apparatus of the present invention, there is provided a superheated steam treatment apparatus capable of efficiently treating an object by superheated steam containing a high concentration of highly reactive hydroxyl radicals.

DESCRIPTION OF EMBODIMENTS

First Embodiment

Figure 1:
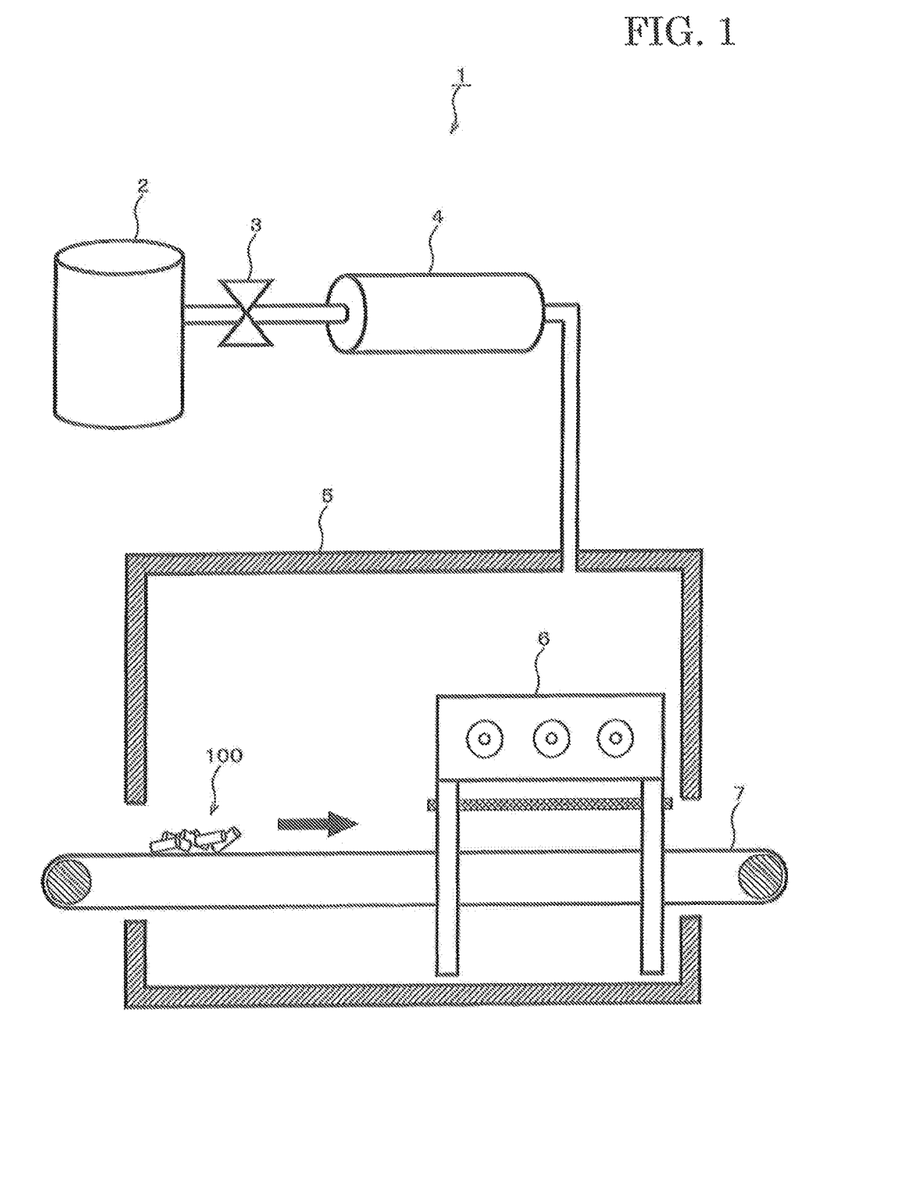
FIG. 1 is a schematic view showing the configuration of a superheated steam treatment apparatus 1 according to a first embodiment of the present invention.

Hereinbelow, a superheated steam treatment apparatus 1 according to a first embodiment of the present invention will be described with reference to the drawings. FIG. 1 is a schematic view showing the configuration of the superheated steam treatment apparatus 1 according to the first embodiment of the present invention. The superheated steam treatment apparatus 1 comprises a boiler 2, a valve 3, an induction heating unit 4, a treatment chamber 5, a discharge treatment unit 6 and a belt conveyor 7.

The boiler 2 generates saturated steam by heating and boiling water supplied from a faucet, not shown. The water supplied to the boiler 2 is preferably clean water purified with a water purifier. The pressure of the saturated steam generated by the boiler 2 is set within the range of 1.1 to 1.6 atmospheres, preferably, 1.2 to 1.4 atmospheres. It is not desirable that the pressure of the saturated steam drops below 1.1 atmospheres, because it reduces the amount of superheated steam that will be generated by the induction heating unit 4. Also, it is not desirable that the pressure of the saturated steam exceeds 1.6 atmospheres, because the clusters of water molecules become difficult to break down, resulting in an insufficient concentration of hydroxyl radicals in the final output of the superheated steam treatment apparatus 1. The boiler 2 is connected to the induction heating unit 4 through a pipe, and the valve 3 is placed in the middle of the pipe. The valve 3 is a flow path opening/closing means for selectively permitting or blocking the supply of the steam generated by the boiler 2 to the downstream induction heating unit 4.

Figure 2:
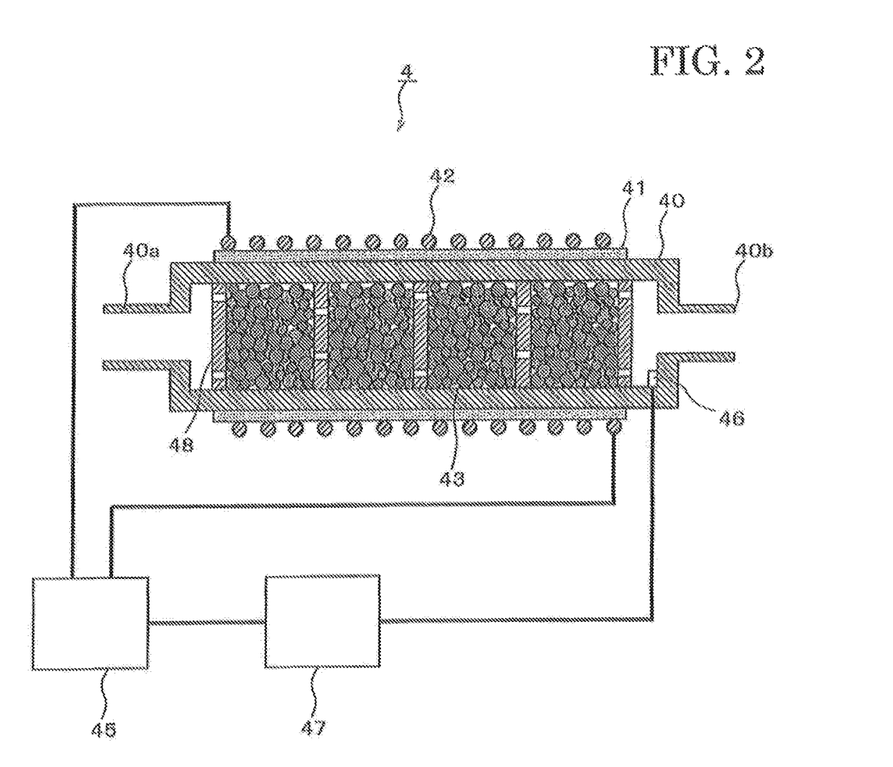
FIG. 2 is a sectional view showing the structure of an induction heating unit 4.

FIG. 2 is a sectional view of the induction heating unit 4. The induction heating unit 4 comprises a cylindrical container 40 having an inlet 40a and an outlet 40b, a high-frequency induction coil 42 composed of a copper wire or pipe wound around it with an insulation 41 therebetween, a high-frequency power source 45 for supplying a high-frequency current to the high-frequency induction coil 42, induction heating members 43 contained in the container 40 and intended to be induction heated by the high-frequency current while allowing the passage of steam, a temperature sensor 46 located near the outlet 40b of the container 40 for detecting the temperature of superheated steam produced by induction heating, and a controller 47 for controlling the high-frequency power source 45 based on the detection results from the temperature sensor 46.

Preferably, the container 40 is made of a material that is substantially unable to be induction heated by the high-frequency current passing through the high-frequency induction coil 42 and will not be deteriorated by the generated superheated steam. Examples of such materials include a non-magnetic stainless steel (e.g., SUS304), a non-magnetic metal such as aluminum or copper, a ceramic, a heat-resistant glass and a graphite. In the case of employing the non-magnetic metal, the inner wall of the container 40 may be coated with a glass so as to enhance the anti-corrosion properties. For easy maintenance, the container 40 may be detachably composed of a plurality of cylindrical bodies with flanges.

The inside of the container 40 is partitioned with a plurality of partition walls 48, one or more openings are formed in each of the partition walls 48 so as to allow the passage of steam. The openings in adjacent partition walls 48 are not aligned with each other so as not to face each other. Concentric grooves may be formed in the surface of the partition walls to have the openings at the bottom of the grooves. With these grooves, the openings can be prevented from being blocked by the induction heating members 43 filled therein. Since the misalignment between the openings increases the flow resistance, the introduced steam can be kept in the container and effectively affected by heat produced by the induction heating members 43. It should be noted that since the particles are packed in the lower part to leave some space above it, it is preferable that no opening is formed in the upper part of the partition wall.

The number of the partition walls 48 may be arbitrary, but since there is a limit to the size of the container 40, the practical number is from 5 to 30. For example, the partition walls having a thickness of 5 mm may be arranged at intervals between 0 and 20 mm. Moreover, when the partition walls 48 should be arranged at small intervals close to 0 mm, the front and rear wall surfaces of the partition wall 48 may be recessed at the central part thereof so that the central part ensures a sufficient space to let the steam move in the radial direction while a small distance is kept between the partition walls 48 at the circumferential part thereof. The openings formed in the partition wall 48 have a maximum diameter equal to or less than 5 mm, preferably, equal to or less than 2 mm, and, preferably, 10 to 100 openings are formed in each partition wall 48. The material of the partition wall 48 is preferably, but not limited to, a soft magnetic metal having excellent eddy-current generation efficiency, practically, a magnetic stainless steel (SUS430, SUS403, SUS447J1, SUSXM27, etc.).

Since induction heating is a heating method using eddy-current losses or magnetic hysteresis losses generated in an electric conductor placed in a high-frequency magnetic field, the induction heating members 43 are preferably made of a material having excellent soft magnetic properties. Moreover, since the induction heating members 43 are to be exposed to superheated steam, it is preferable that they have excellent anti-corrosion properties. Therefore, the induction heating members 43 are preferably made of a soft magnetic metal having excellent anti-corrosion properties. In practice, such a metal is preferably a magnetic stainless steel (SUS430, SUS403, SUS447J1, SUSXM27, etc.). Alternatively, there may be used a conductive ceramic such as carbon ceramics composed, for example, of carbon and borosilicate glass. In order to prevent any flux of steam from passing through the induction heating unit 4 without being affected by heat from the induction heating members 43, the porosity of the induction heating members 43 is preferably equal to or less than 30% so as to increase the flow resistance.

The induction heating members 43 filling one space partitioned with the partition walls 48 reduce the maximum flow velocity of the introduced saturated steam and also change the direction. Also in the next space after passing through the partition wall 48, the steam can move in various directions because of the induction heating members 43. Thus, as the steam passes through the spaces partitioned with the partition walls 48, its moving direction becomes completely random and its velocity becomes uniform, so that it can be uniformly heated by the eddy-current generated by the electromagnetic induction, whereby the clusters of superheated steam break down to smaller ones, partly because of the action of the high-frequency waves.

In a preferred embodiment of the present invention, the induction heating members 43 are preferably spherical or amorphous magnetic particles. In order to increase the contact area with steam, it is preferable to use amorphous particles or particles having different diameters. It is also effective to make the particles surface or the wall surface uneven. The particle diameter is not particularly limited, but is preferably about 3 to 9 mm so that it is too large to pass through the openings formed in the partition walls 48.

The superheated steam produced by heating in the induction heating unit 4 is supplied to the treatment chamber 5 through a pipe. The temperature of the superheated steam introduced into the treatment chamber 5 preferably falls within the range of 110 to 250° C. The treatment chamber 5 covers the discharge treatment unit 6 and a part of conveyance path by the belt conveyor 7, separating the inside from the outside to have a superheated steam atmosphere.

Figure 3A:
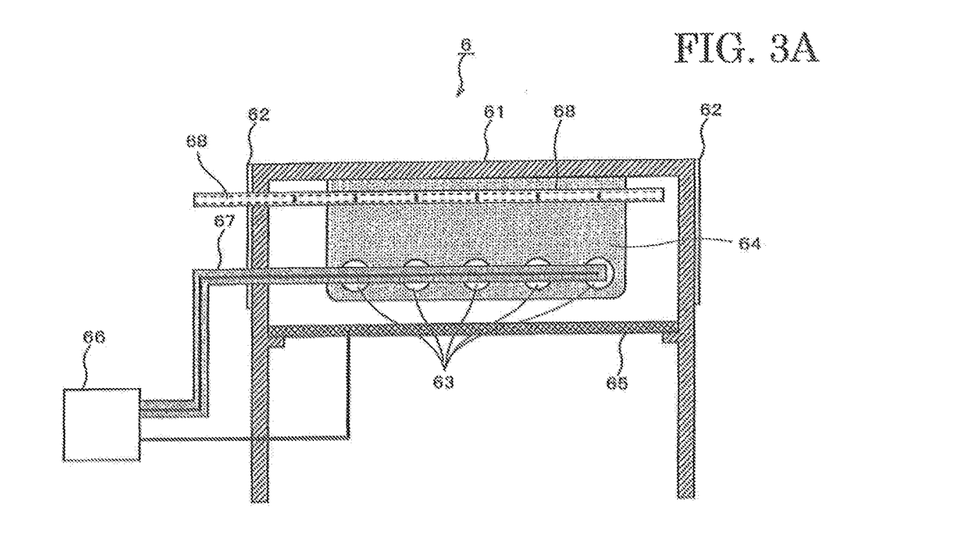
FIG. 3A is a schematic view showing the cross-section structure of a discharge treatment unit 6 as seen in a direction perpendicular to the moving direction of an object 100.
Figure 3B:
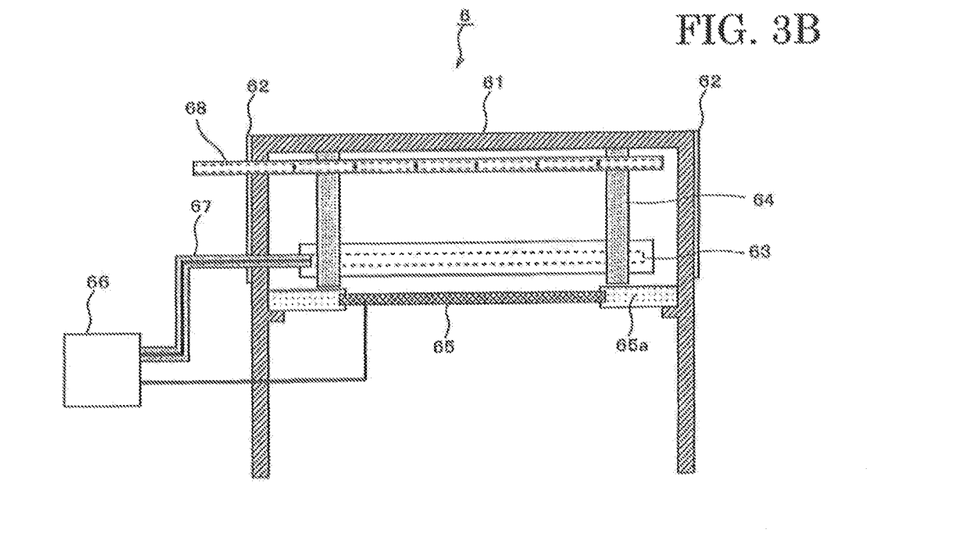
FIG. 3B is a schematic view showing the cross-section structure of the discharge treatment unit 6 as seen in the moving direction of the object 100.

The discharge treatment unit 6 is put in the superheated steam atmosphere, so that water molecules are dissociated into radicals by barrier discharge generated in the superheated steam atmosphere to increase the concentration of hydroxyl radicals in the superheated steam. FIG. 3A is a schematic view showing the cross-section structure of the discharge treatment unit 6 as seen in a direction perpendicular to the moving direction of an object 100. On the other hand, FIG. 3B is a schematic view showing the cross-section structure of the discharge treatment unit 6 as seen in the moving direction of the object 100. The discharge treatment unit 6 includes a frame 61, discharge tubes 63, a discharge tube holder 64, an opposite electrode 65, a high-frequency power source 66, a high-voltage cable 67, and a gas supply port 68.

The frame 61 is a support frame for the discharge treatment unit 6, composed of four pillars and beams made of an aluminum alloy. The top side of the frame 61 is open, while four lateral sides are closed at the upper part thereof with upper side walls 62 made of a heat-resistant glass. The upper side walls 62 prevent the discharge-treated superheated steam from dissipating in four directions, efficiently the object 100 moving below the discharge treatment unit 6. The pillars 62 are disposed as legs at both sides of the belt conveyor 7 without having no side wall at the lower part of the four lateral sides.

Figure 4:
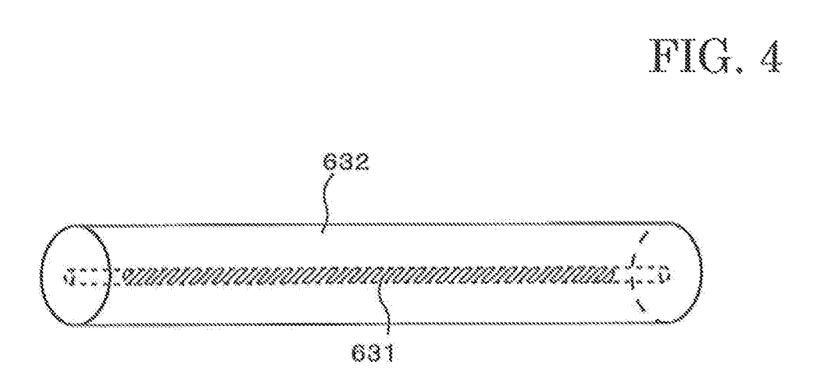
FIG. 4 is an external view showing the structure of a discharge tube.

FIG. 4 is an external view showing the structure of the discharge tube 63. The discharge tube 63 is constructed such that a central conductor 631, which serves as a discharge electrode, is enclosed by a central part of a tube of an insulator 632. The insulator tube 632 must withstand high-frequency discharge at a high temperature atmosphere of 250 to 300° C. and corrosion by hydroxyl radicals. In order to meet such requirements, there may be used a glass or ceramic such as quartz glass, borosilicate glass or alumina, for example, having a diameter of 3 to 30 mm$\phi$ and a thickness of 0.5 to 3 mm. The length of the discharge tube 63 is not limited, but may be about 100 to 500 mm, for example, in view of the size, strength, etc. of the frame 61 and the treatment chamber 5. If the anti-corrosion properties are not required, it may not be coated with an insulator. The central conductor 631 is made of a material satisfying the requirements as to the anti-corrosion properties, workability and cost, e.g., tungsten, molybdenum, an stainless alloy (SUS304, etc.) or a nickel-chrome alloy (Inconel, etc.), having a diameter of 0.1 to 10 mm$\phi$. If the electrode has an extremely small diameter, deflection may occur, so that the application of tension is required to prevent the deflection, and it may also be deteriorated by discharge to have a problem in durability. Therefore, it is desirable that the diameter of the central conductor 631 is made equal to or greater than about one-fiftieth the length so as to ensure enough strength and prevent the deflection. In order to suppress unintended discharge between the central conductor 631 and a lead therefrom and the opposite electrode 65, the opposite electrode 65 and the central conductor 631 are disposed with their ends located about 20 mm inwardly from the ends of the tube 632. It should be noted that the central conductor 631 (discharge electrode) is not limited to the above shape and may have a plate shape, a square bar shape or a linear shape; the inner surface of the insulator tube 632 may be plated or coated with a metal or a coating in which the metal is dispersed.

The discharge tube holder 64 holds the discharge tubes 63 in a generally horizontal position while ensuring the insulation with the frame 61. In the present embodiment, the number of the discharge tubes 63 to be held by the discharge tube holder 64 is five, but the number of the discharge tubes 63 may be larger or smaller than this. Preferably, the discharge tube holder 64 is made of Teflon (registered trademark) so as to satisfy the requirements as an insulating member for the high-frequency, high-voltage discharge. When limited to the use in an oxygen-free (0.5% or less, preferably 0.2% or less) atmosphere, it may be made of a heat-resistant silicone resin or rubber. In order to treat the object 100 uniformly, moreover, the discharge tube holder 64 holds the discharge tubes 63 such that the longitudinal direction of the discharge tube 63 is at right angles with the transport direction of the belt conveyor 7.

The opposite electrode 65 is preferably made of, but not limited to, an etched or pressed metal plate such as a stainless alloy (SUS304, etc.) of 5-100 meshes (the number of meshes per inch). The length of the opposite electrode 65 in the transport direction of the belt conveyor 7 is about the same as or greater than the length of the region in which the discharge tubes 63 are arranged. In order to suppress unintended discharge between the lead or the like and the opposite electrode 65, on the other hand, the opposite electrode 65 has a width (i.e., length in a direction perpendicular to the transport direction of the belt conveyor 7) smaller than the length of the discharge tube 63 and placed such that the entire electrode can face the discharge tubes 63 as seen in the width direction. At both ends of the opposite electrode 65 in the width direction, insulator fringes 65a are disposed. The opposite electrode 65 is fixed at a position slightly below the lower end of the upper side wall 62 in the frame 61. The distance between discharge electrodes (the distance between the discharge tube 63 and the opposite electrode 65) is preferably equal to or less than 15 mm; the discharge tube 63 and the opposite electrode 65 are preferably arranged to have a discharge creepage distance of 40 to 60 mm. Since the discharge occurs between the discharge tubes 63 and the opposite electrode 65 made of a metal mesh, the discharge condition will never be affected by the shape, the properties or the feed rate of the object 100, which results in constant load, keeping the voltage low during stable discharge. Moreover, if the object 100 is directly exposed to discharge, the object 100 may be damaged by local high energy (high temperature); but the object 100 will never be damaged in the method according to the present embodiment using the discharge between the discharge tube 63 and the opposite electrode 65 made of a metal mesh. Since the opposite electrode 65 is a mesh, hydroxyl radicals generated by the discharge treatment can easily reach the lower region of the frame 61 through the opposite electrode 65.

The high-frequency power source 66 is a power source capable of generating high frequency high voltage to be applied between the discharge tube 63 and the opposite electrode 65. The applied frequency may be arbitrarily set within the range of 5 to 50 kHz, but preferably falls within the range of 10 to 30 kHz so as to generate a proper degree of discharge and a suitable concentration of hydroxyl radicals. The higher the frequency, the lower the power consumption for obtaining a certain power. If lower than the above range, the frequency of discharge becomes too low to increase the concentration of hydroxyl radicals. If the frequency is extremely high, it becomes difficult to achieve insulation shield (the leakage magnetic flux increases), so that the energy efficiency decreases and the risk of electric shock increases. In addition, the soft magnetic metal may be magnetized to cause a failure in a mechanism such as a clock.

The applied voltage at the beginning of the discharge may be set within the range of 1 to 100 kV so as to obtain an optimum condition for stable discharge, but in general, it is preferably from 5 to 20 kV. If the voltage is lower than the above range, stable discharge cannot be achieved unless the distance between the electrode and the ground is reduced, which results in reducing the plasma generation area and is therefore unsuitable for volume production. If the voltage is higher, on the other hand, it becomes difficult to achieve insulation shield, so that the energy efficiency decreases and the risk of electric shock increases. The power consumption may be arbitrarily set within the range of 0.1 to 10 kW depending on the intended degree of treatment for the object 100. For example, the high-frequency power source 66 generates an AC (sinusoidal) voltage of ±10 kV, 25 kHz and 600 W. The voltage generated by the high-frequency power source 66 is applied to the discharge tubes 63 through the high-voltage cable 67. Preferably, the high-voltage cable 67 has a Teflon coating around a central conductor so as to ensure insulation. When limited to the use in an oxygen-free (0.5% or less, preferably 0.2% or less) atmosphere, moreover, there may be used a heat-resistant silicone resin or rubber coating.

The gas supply port 68 is a gas supply port capable of supplying various kinds of gases such as an argon gas or a helium gas to the discharge atmosphere within the region surrounded by the upper side walls 62 in the frame 61. The gas supply port 68 is located above the discharge tubes 63 and connected to a gas supply source (not shown) outside the treatment chamber 5 through a pipe. The lifetime of plasma can be extended to double the active space by introducing an argon gas, a helium gas or a mixture gas thereof into the discharge atmosphere. An effective way is to introduce 20 to 400 parts by weight relative to 100 parts by weight of the superheated steam. Too much introduction reduces the activity. Moreover, when the introduced saturated steam contains an argon gas at 50% by volume (222 parts by weight), the dew point can be reduced to 81.8° C. to thereby enable generation of stable, active steam plasma at 90° C., which greatly expands the range of applicable materials. If necessary, oxygen, carbon dioxide or the like may further be introduced to have additional effects such as sterilization, hydrophilization (introduction of hydroxy groups) and introduction of polar groups other than hydroxy groups.

When the discharge treatment unit 6 is constructed as above, the energy necessary for discharge can be minimized to improve the energy efficiency of the discharge treatment. In addition to the barrier discharge, creeping discharge, corona discharge, arc discharge, etc. can be used in the discharge method, and the most appropriate method can be determined based on the intended use and the irradiation conditions and restrictions, but the barrier discharge is superior in terms of stable, great output power.

The belt conveyor 7 is a conveyor means for conveying the object 100. The belt conveyor 7 transports the object 100 into the treatment chamber 5 so as to subject it to the pretreatment in a superheated steam atmosphere and the treatment by activated superheated steam during the transportation inside the treatment chamber 5 and transports the treated object 100 out of the treatment chamber 5. At an upstream part of the conveyance path inside the treatment chamber 5, the pretreatment is performed in the superheated steam atmosphere inside the treatment chamber 5. In this pretreatment, the object 100 is pre-heated, dried and deoxygenated. At a downstream part of the conveyance path, on the other hand, it is passed immediately below the opposite electrode 65 in the discharge treatment unit 6 and subjected to the treatment by active superheated steam containing a high concentration of hydroxyl radicals.

Figure 5:
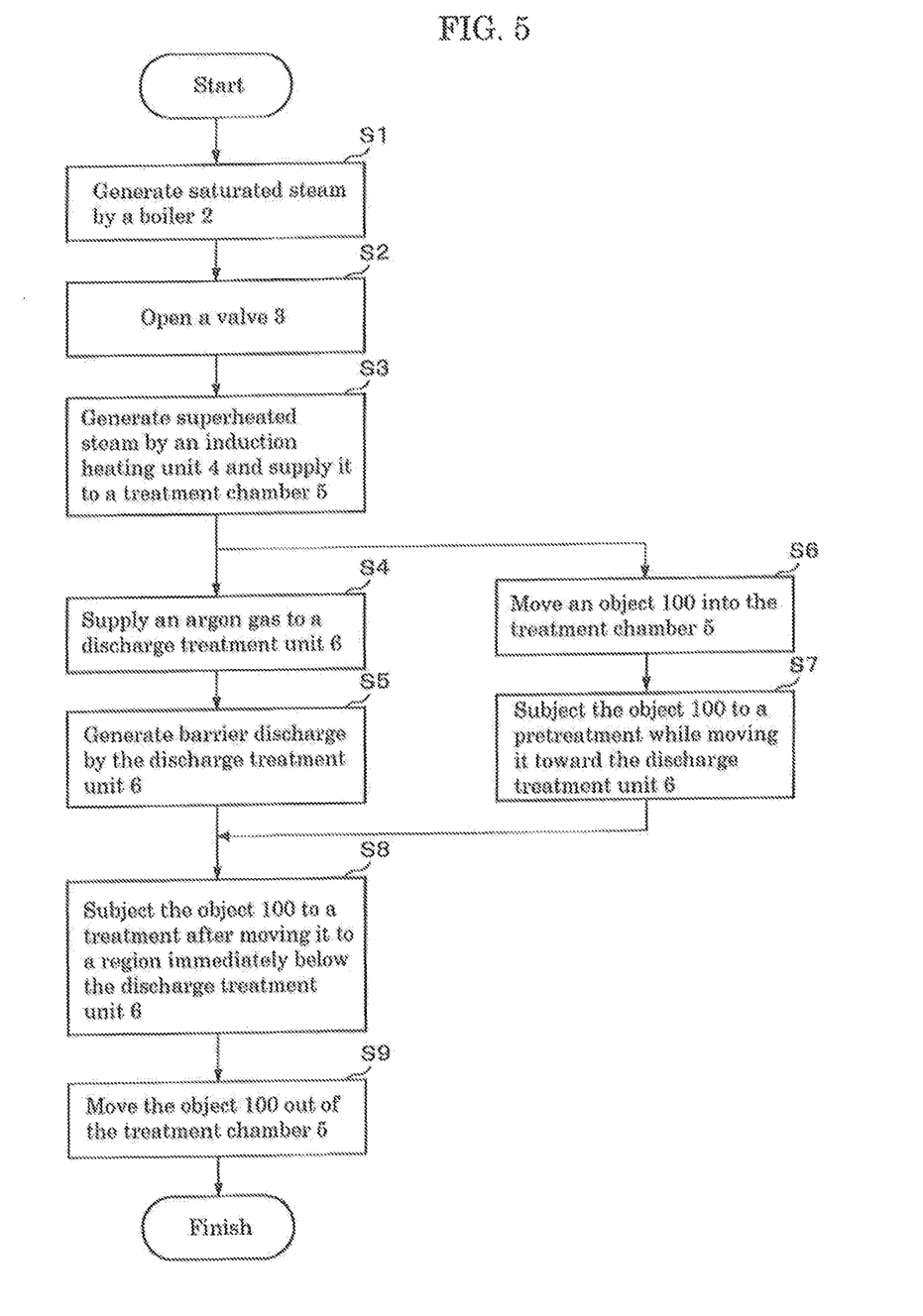
FIG. 5 is a flow chart showing the procedure in the superheated steam treatment apparatus 1 according to the first embodiment.

Hereinbelow, the treatment process by the superheated stream treatment apparatus 1 according to the first embodiment will be described with reference to the flow chart shown in FIG. 5.

At first, saturated steam at 100° C. or more, for example, at 110 to 140° C., is generated by the boiler 2 (S1). The pressure of the saturated steam is set within the range of 1.1 to 1.6 atmospheres. The valve 3 is opened to supply the saturated steam to the induction heating unit 4 (S2). Then, the saturated steam is heated by the induction heating unit 4 to generate superheated steam (S3). The temperature of the superheated steam is controlled to a desired value within the range of 200 to 350° C. The generated superheated steam is supplied to the treatment chamber 5 through the pipe. Inside the treatment chamber 5 filled with the superheated steam, the temperature is set at a desired value within the range of 190 to 350° C. depending on the temperature and flow rate of the supplied superheated steam.

After the beginning of the introduction of the superheated steam into the treatment chamber 5, an argon gas is supplied to the discharge treatment unit 6 through the gas supply port 68 (S4). The argon gas may be supplied at the same time as the saturated steam is supplied to the induction heating unit 4. It is also possible to remove this step and not to supply the argon gas. The discharge treatment unit 6 treats the supplied superheated steam by barrier discharge to generate superheated steam containing a high concentration of hydroxyl radicals (S5).

In parallel with the discharge treatment by the discharge treatment unit 6, the object 100 is transported into the treatment chamber 5 by the belt conveyor 7 (S6). Between the instant when it enters the treatment chamber 5 and the instant when it reaches a region below the discharge treatment unit 6, the object 100 is subjected to a pretreatment for pre-heating, drying and removal of oxygen by the superheated steam filling the treatment chamber 5 (S7). The pretreatment time varies depending on the distance and speed to travel to the discharge treatment unit inside the treatment chamber 5. Then, once the object 100 reaches the region below the discharge heating unit 6, the object 100 can be treated, e.g., dried and carbonized by the superheated steam containing a high concentration of hydroxyl radicals generated by barrier discharge at the discharge treatment unit 6 (S8). The treatment time varies depending on the length of the discharge treatment unit 6 and the travelling speed. The object 100 after passing through the region below the discharge treatment unit 6 is moved out of the treatment chamber 5 (S9), thus finishing the process.

With the superheated steam treatment apparatus 1 described above, the object 100 can be efficiently treated by superheated steam containing a high concentration of highly reactive hydroxyl radicals in a continuous manner.

Second Embodiment

Figure 6:
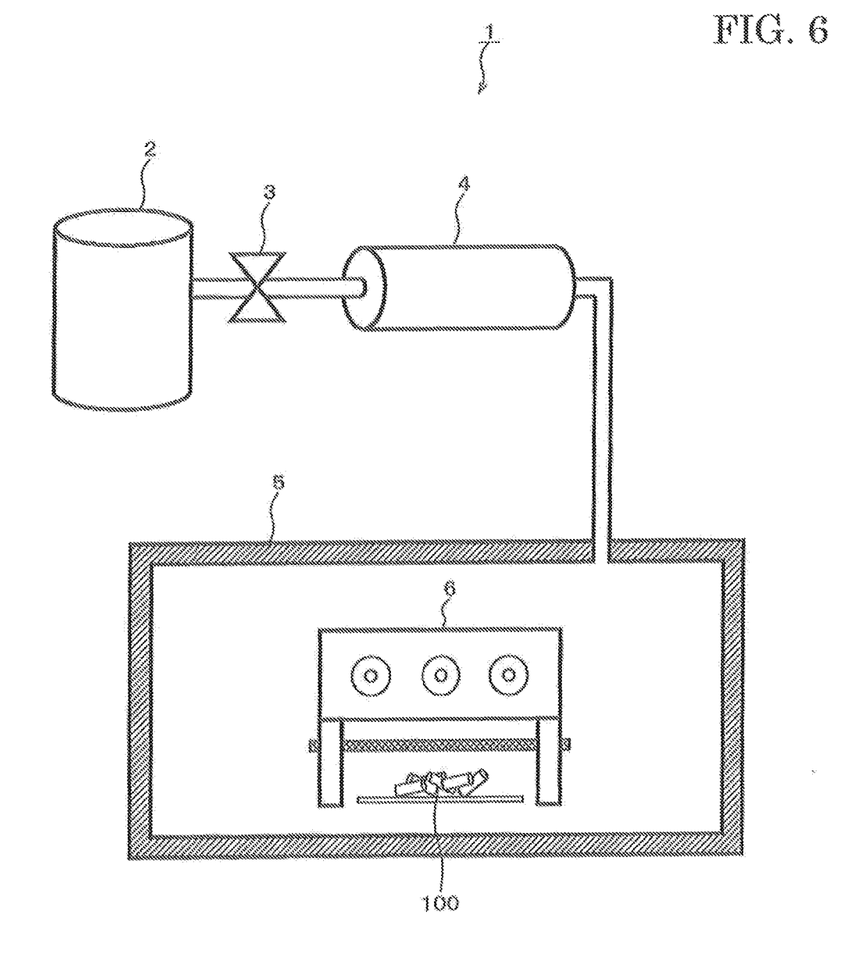
FIG. 6 is a schematic view showing the configuration of a superheated steam treatment apparatus 1 according to a second embodiment of the present invention.

FIG. 6 shows the configuration of a superheated steam treatment apparatus 1 according to a second embodiment of the present invention. This embodiment is characterized by not having the belt conveyer 7 as in the first embodiment, so that the object 100 should be placed immediately below the opposite electrode 65 in the discharge treatment unit 6. It should be noted that since the other components are the same as those in the foregoing first embodiment except for the changes resulting from the removal of the belt conveyor 7, the explanation thereof will be omitted hereinbelow.

Figure 7:
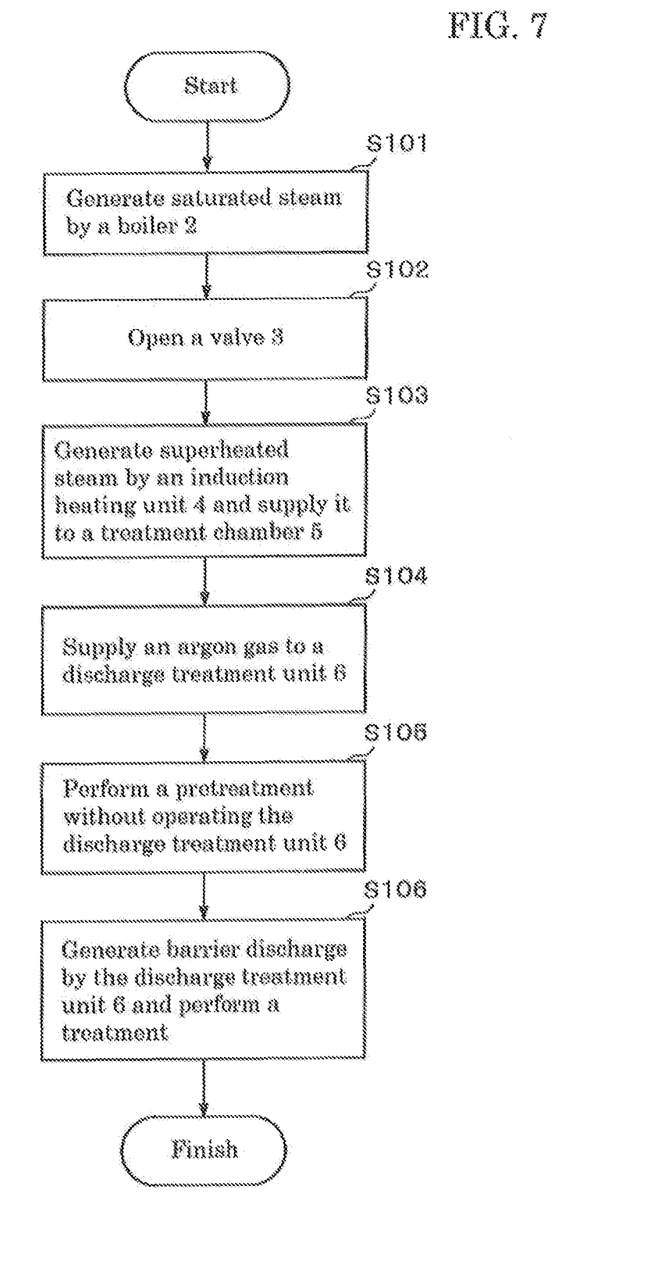
FIG. 7 is a flow chart showing the procedure in the superheated steam treatment apparatus 1 according to the second embodiment.

Hereinbelow, the treatment process by the superheated stream treatment apparatus 1 according to the second embodiment will be described with reference to the flow chart shown in FIG. 7.

Prior to the treatment, the object 100 is placed immediately below the opposite electrode 65 in the discharge treatment unit 6. At the start of the treatment, saturated steam at 100° C. or more, for example, at 110 to 140° C., is generated by the boiler 2 (S101). The pressure of the saturated steam is set within the range of 1.1 to 1.6 atmospheres. The valve 3 is opened to supply the saturated steam to the induction heating unit 4 (S102). Then, the saturated steam is heated by the induction heating unit 4 to generate superheated steam (S103). The temperature of the superheated steam is controlled to a desired value within the range of 200 to 350° C. The generated superheated steam is supplied to the treatment chamber 5 through the pipe. Inside the treatment chamber 5 filled with the superheated steam, the temperature is set at a desired value within the range of 190 to 350° C. depending on the temperature and flow rate of the supplied superheated steam.

After the beginning of the introduction of the superheated steam into the treatment chamber 5, an argon gas is supplied to the discharge treatment unit 6 through the gas supply port 68 (S104). The argon gas may be supplied at the same time as the saturated steam is supplied to the induction heating unit 4. For a predetermined time (e.g., 15 minutes) after the beginning of the introduction of the superheated steam into the treatment chamber 5, the pretreatment for pre-heating, drying and removal of oxygen is performed without supplying power to the discharge treatment unit 6 (S105).

After the elapse of the predetermined time, the discharge treatment unit 6 is turned on, so that the superheated steam is treated by barrier discharge to generate superheated steam containing a high concentration of hydroxyl radicals. The object 100 can be treated, e.g., dried and carbonized by the superheated steam containing a high concentration of hydroxyl radicals. The discharge treatment is performed for a predetermined time (e.g., 5 minutes) (S106). Then, the discharge treatment unit 6 is turned off, thus finishing the process. After the process is completed, the object 100 is taken out of the treatment chamber 5.

With the superheated steam treatment apparatus 1 according to the second embodiment, the object 100 can be efficiently treated by superheated steam containing a high concentration of highly reactive hydroxyl radicals in a batch processing manner.

EXAMPLES

Example 1

For the induction heating unit, used was a container made of SUS430 and having an outside diameter of 120 mmφ, a thickness of 5 mm and a length of 250 mm. A 10 mm space in the moving direction of the saturated steam was formed with a first partition wall disposed at the end thereof. Other partition walls were disposed at intervals of 10 mm in the moving direction of the saturated steam. Each partition wall had a thickness of 5 mm, and concentric grooves having a width of 2 mm, a depth of 2 mm and a radius of 90 mm, 70 mm or 50 mm were formed in its surface along the circumference. At the bottom of the groove, 2 mmϕ through-holes are formed at regular intervals. Pellets (induction heating members 43) were 5 mmϕ particles of SUS430, filling up each space. The high-frequency power source for the induction heating unit was such that an input voltage being a commercial power supply of 200 VAC, 60 Hz and 20 kW was converted to a high frequency high voltage of 20 kHz by an inverter, and then, the high frequency high voltage was applied to the secondary induction coil (10 turns of 10 mmϕ pure copper wire).

In the discharge tube for the discharge treatment unit, an artificial quartz glass pipe having an outside diameter of 10 mmϕ, an inside diameter of 6 mmϕ and a length of 250 mm was used as an insulator, while an SUS304 electrode having an outside diameter of 5 mmϕ and a length of 280 mm was used as a central conductor. Five discharge tubes were set in a suspended manner with the discharge tube holder. They were arranged with a center-to-center distance of 30 mm between adjacent discharge tubes so as to produce a discharge atmosphere over about 150 mm in the transport direction of the belt conveyer. For the opposite electrode, used was an etched SUS304 plate of 20 meshes. The applied voltage was at ±10 kVAC, 20 kHz and 600 W. The discharge treatment unit was placed over the belt conveyor having a width of 50 cm and a height of 50 cm. The transportation distance for the pretreatment inside the treatment chamber was set at 600 mm and the transportation velocity of the belt conveyor belt conveyor was set at 30 mm/minute, so that the pretreatment was performed for 20 minutes and the treatment in a discharge atmosphere was performed for 5 minutes.

The experiment was conducted by varying the temperature of the heating element within the range of 300° C. to 400° C. and the temperature inside the treatment chamber 7 within the range of 190° C. to 260° C. 100 g of bamboo chips having a section width of 1 to 2 mm, a length of 5 to 15 mm and a water content of 10% was subjected to the treatment, and uniform bamboo charcoal was produced when the treatment was performed for 5 minutes at 200° C. inside the treatment chamber. In the above, the temperature of the heating element was 315° C.

Example 2

In Example 1, an argon gas was added at a flow rate of 8 L/minute one minute ahead of the beginning of the discharge. In the above, the argon gas was supplied at 50 parts by weight relative to 100 parts by weight of the superheated steam. The other conditions were the same as those in Example 1. 500 g of the same bamboo chips as in Example 1 was subjected to the treatment, and uniform bamboo charcoal was produced when the treatment was performed for 5 minutes at 200° C. inside the treatment chamber. By mixing 50 parts by weight of the argon gas, the yield was increased fivefold under the same conditions.

Example 3

In place of the induction heating unit in Example 1, a commercially available superheated steam generator (Genesis manufactured by Nomura Engineering Co., Ltd.) was used under the conditions of 25 kHz and 20 kW. The experiment was conducted by varying the temperature of the superheated steam generator within the range of 350° C. to 550° C. and the temperature inside the treatment chamber within the range of 220° C. to 350° C. 100 g of the same bamboo chips as in Example 1 was subjected to the treatment, and uniform bamboo charcoal was produced when the treatment was performed for 20 minutes at 230° C. inside the treatment chamber. In the above, the temperature of the superheated steam generator was 360° C. It should be noted that a part not exposed to the discharge-treated superheated steam was hardly carbonized.

Example 4

The belt conveyor in Example 3 was removed, and in the batch processing type superheated steam treatment apparatus, an object placed immediately below the discharge treatment unit was treated for 15 minutes only by superheated steam, and then the discharge treatment unit was turned on to perform the discharge treatment for more 5 minutes. As a result, the same result as in Example 3 was obtained.

Comparative Example

The same induction heating unit as in Example 1 was used. On the other hand, the discharge treatment unit was different from that in Example 1; the discharge treatment was performed by introducing superheated steam into a discharge treatment unit 8 having the structure shown in FIG. 8 and the resulting discharge-treated superheated steam was delivered to the vicinity of an object through a pipe. Specifically, a quartz glass tube having an outside diameter of 20 mmϕ, a thickness of 2 mm and a length of 110 mm was used as an discharge tube 81, while an SUS304 having a diameter of 2 mmϕ was used as a central conductor 82. As a flange of the discharge tube 81, a Teflon plug capable of withstanding about 300° C. was used to prevent cracking of the glass due to heat shock, while a flange at the superheated steam inlet to be connected to the flange at the superheated steam outlet of the induction heating unit was made of a heat-resistant silicone rubber. Around the central part of the discharge tube 81, a 20-mesh opposite electrode 83 made of a stainless alloy (SUS304) and having a width of 50 mm was placed and grounded. A distance of 30 mm was kept at both ends. The voltage applied by a high-frequency power source 84 was at ±10 kVAC, 25 kHz and 600 W.

Figure 8:
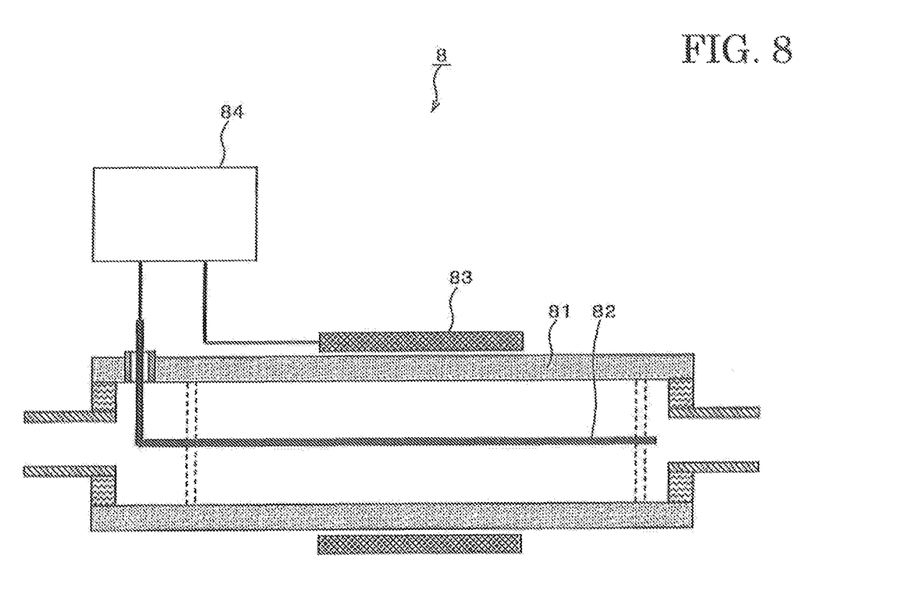
FIG. 8 is a sectional view showing the structure of a discharge treatment unit used for Comparative Example.

The induction heating unit and the discharge treatment unit were joined together by a silicone rubber and arranged to have the longitudinal direction of the discharge tube aligned with the vertical direction. With this apparatus, the experiment was conducted by varying the temperature of the induction heating unit within the range of 350° C. to 550° C. and the temperature inside the treatment chamber within the range of 220° C. to 350° C. At a position 5 mm apart from the superheated steam outlet of the discharge tube, the same bamboo chips as in Example 1 were stacked in a thickness of 5 mm over an area having a radius of 50 mm from the center of the outlet. Good quality bamboo charcoal was produced immediately below the outlet when the superheated steam was applied for 30 minutes at 250° C. inside the treatment chamber while generating barrier discharge. In the above, the temperature of the heating element was 400° C.

As described above, even in Comparative Example using the improved induction heating unit, the treatment temperature is lower than before, but the treatment temperature can be reduced more in Examples 1 to 4 than in Comparative Example, and the time can also be remarkably reduced.

In the prior art, the lower temperature limit for carbonization of wood is 350° C., and forced cooling, for example, by pouring water has been required so as to prevent ignition after the treatment. In addition, the induction heating unit has to operate continuously at a high temperature of 550° C., resulting in increasing the cost of components used in the apparatus and the processing cost. Also, the heating element disadvantageously deteriorates in a few months, prohibiting widespread use of superheated steam.

According to the present invention, in laboratory-scale amount, good quality bamboo charcoal was produced by the treatment for 20 minutes at 250° C. In the above, the temperature of the heating element was 400° C. It is also found that wood flour broken into particles of 100 microns or less and having a large surface area, which could not have been carbonized by the conventional method, could be carbonized at a low temperature.

Moreover, low temperature carbonization of charcoal at an industrial production level, which could not have been achieved heretofore, was enabled by placing the built-in discharge treatment unit at a downstream side in the superheated steam treatment chamber and performing the pretreatment by superheated steam at an upstream side.

Specifically, the carbonization can be achieved at a low temperature of 250° C. or less (at a low temperature of 200° C. when the wood chips have a water content of 20% or less). When treated under such low temperature conditions, even if the carbonized chips are exposed to air without being cooled after the treatment, they will never ignite, so that dried charcoal can be produced without pouring water. Moreover, since wastewater containing much tar will not be produced and water will not be poured onto the produced charcoal, it is not necessary to dry it again.

INDUSTRIAL APPLICABILITY

As has been described hereinabove, the present invention is suitably applicable to a superheated steam treatment apparatus.

REFERENCE SIGNS LIST

1 Superheated Steam Treatment Apparatus
2 Boiler
3 Valve
4 Induction Heating Unit
5 Treatment Chamber
6 Discharge Treatment Unit

The invention claimed is:
1. A superheated steam treatment apparatus comprising
an induction heating unit configured to generate superheated steam by induction heating saturated stream,
a treatment chamber configured to allow the superheated steam generated by the induction heating unit to be introduced thereinto, and
a discharge treatment unit located in the treatment chamber and configured to treat the introduced superheated steam by discharge,
the discharge treatment unit being characterized by having
a frame serving as a support for the discharge treatment unit,
a discharge electrode located at an upper part of the frame,
a mesh-like opposite electrode located below the discharge electrode, and
a high-frequency power source configured to supply high-frequency, high-voltage power between the discharge electrode and the opposite electrode to cause the discharge, whereby an object immediately below the opposite electrode is allowed to be treated by the superheated steam having an increased hydroxyl radical concentration due to the discharge.

2. The superheated steam treatment apparatus of claim 1, characterized by further comprising a conveyor means for moving the object into the treatment chamber, through a region immediately below the opposite electrode in the discharge treatment unit, and out of the treatment chamber.

3. The superheated steam treatment apparatus of claim 2, characterized in that at a position upstream of the discharge treatment unit inside the treatment chamber, the conveyor means permits the object to be exposed to the superheated steam introduced into the treatment chamber so as to perform pretreatment.

4. The superheated steam treatment apparatus of claim 1, characterized in that with the object placed immediately below the opposite electrode of the discharge treatment unit,
the high-frequency power source avoids supplying the power to the discharge treatment unit for a predetermined time after the introduction of the superheated steam into the treatment chamber, thereby allowing the object to be pretreated for the predetermined time by the superheated steam inside the treatment chamber, and
after the elapse of the predetermined time, the high-frequency power source starts to supply the power to the discharge treatment unit to cause the discharge.

5. The superheated steam treatment apparatus of claim 1, characterized in that the discharge treatment unit has a gas supply port for supplying a gas to a region where the discharge occurs, and upon the introduction of the superheated steam into the treatment chamber, the gas supply port allows an argon gas, a helium gas or a mixture gas thereof to be supplied at a ratio of 20 to 400 parts by weight to 100 parts by weight of the superheated steam.

6. The superheated steam treatment apparatus of claim 1, characterized by further comprising an insulator member between the discharge electrode and the opposite electrode.

7. The superheated steam treatment apparatus of claim 6, characterized in that the insulator member is a cover enclosing the discharge electrode.

8. The superheated steam treatment apparatus of claim 1, characterized in that the induction heating unit is a cylindrical container partitioned into a plurality of spaces with a plurality of partition walls, and one or more openings are formed in each of the partition walls such that openings in adjacent partition walls do not face each other.

9. The superheated steam treatment apparatus of claim 8, characterized in that the opening has a maximum diameter equal to or less than 5 mm.

10. The superheated steam treatment apparatus of claim 8, characterized in that the spaces partitioned with the partition walls are filled with spherical or amorphous magnetic particles to have a porosity equal to or less than 30% inside the container.

11. The superheated steam treatment apparatus of claim 1, characterized in that the saturated steam supplied to the induction heating unit has a pressure of 1.1 to 1.5 atmospheres.

* * * * *